Jan. 23, 1968       J. M. HOLAHAN       3,364,612
COMBINATION ROD CLAMP AND REEL SEAT
Filed March 16, 1965       3 Sheets-Sheet 1

INVENTOR.
BY Joseph M. Holahan
ATTORNEYS.

Jan. 23, 1968    J. M. HOLAHAN    3,364,612
COMBINATION ROD CLAMP AND REEL SEAT
Filed March 16, 1965    3 Sheets-Sheet 3

INVENTOR.
Joseph M. Holahan
BY
J. A. Slough
ATTORNEYS.

United States Patent Office 3,364,612
Patented Jan. 23, 1968

3,364,612
COMBINATION ROD CLAMP AND REEL SEAT
Joseph M. Holahan, Geneva, Ohio, assignor, by mesne assignments, to Allegheny Ludlum Steel Corporation, Pittsburgh, Pa., a corporation of Pennsylvania
Filed Mar. 16, 1965, Ser. No. 440,092
11 Claims. (Cl. 43—22)

ABSTRACT OF THE DISCLOSURE

The disclosure shown relates to fishing rod attachment and reel seat fastener means fixedly secured to a handle and detachably secured to a rod and having a reel seat socket integrally formed in the fastener and cooperating with a movable reel seat socket mounted thereon. The reel base, when clamped, is cammed by the integral socket against said rod.

---

My invention relates to fishing rods and relates more particularly to an improved rod and reel assembly.

The primary object of my invention is to provide an improved rod and reel seat assembly wherein the reel is securely mounted on a reel seat in such a manner that the rod is secured to the handle and the reel to the reel seat by the same unit assembly.

A further object of my invention is to provide an improved rod and reel assembly of the type referred to having improved means for locking the rod and for retaining the reel thereon.

Another object is to provide a fishing rod and reel assembly whereby the rod, reel and handle may be easily assembled or disassembled.

Another object of my invention is to provide improved means for locking the reel and rod in such manner that the reel can be readily disengaged but cannot become accidentally displaced.

A still further object of my invention is to provide a rod and reel assembly of the character described which will be economical in manufacture, composed of but few parts and highly efficient and durable in use.

These and other objects of my invention will become more readily apparent by reference to the following description, the appended claims, in which drawings:

Figure 1:
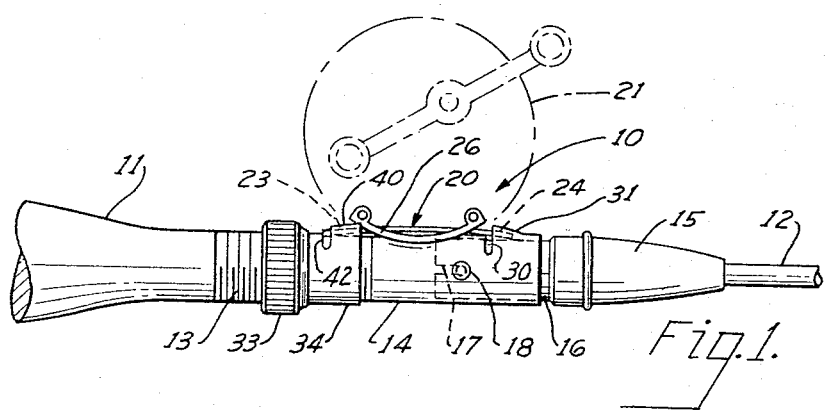
FIGURE 1 is a side elevation of a first embodiment of the rod clamp and reel seat of this invention, the reel being shown in broken lines.
Figure 2:
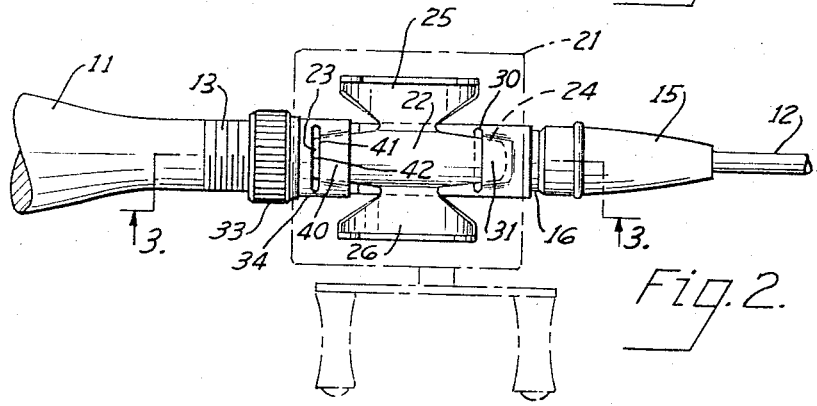
FIGURE 2 is a top plan view of the rod clamp and reel seat of FIGURE 1.

Referring now to the drawings, in all of which like parts are designated by like reference numerals, and referring more particularly to the form of my invention illustrated in FIGURES 1 and 2, the improved rod clamp and reel seat of my invention is generally shown at 10 and comprises a handle portion 11 adapted to carry a detachable rod portion 12. One end of the handle portion 11 is securely fixed within a threaded end portion 13 of a tubular sleeve 14, and a substantial portion of said sleeve projects coaxially beyond said one end in the direction of the rod portion 12. The rod portion at its handle end is provided with the usual stepped end ferrule 15 and a coaxial shank 16, said shank 16 being telescoped into the distal end of the sleeve 14 when assembled to the handle portion 11. The ferrule end of the rod 12 closely but slidably interfits the said sleeve 14 whereby when it is not clamped in place, as herein later described, it can be readily detached. The distal end portion of the ferrule 15 is, in this form of my invention, preferably provided with a diametrically directed slot 17 which is adapted to receive the shank of a headed pin 18 carried at its ends by diametrically opposed wall portions of the sleeve 14. When the ferrule end of the rod 12 is inserted within the sleeve 14, the transversely directed pin 18 is disposed within the slot 17 and aligns the rod portion with the handle portion, preventing relative rotation therebetween.

The upper surface of the tubular sleeve 14, as the invention is oriented in FIGURE 1 affords a reel seat surface for seating a forward portion of a reel stand or base 20 carrying a conventional fishing reel 21 (the latter being indicated in broken lines). The reel stand or base 20 comprises a transversely, arcuately curved elongated central plate portion or saddle 22 having oppositely disposed longitudinally directed, integral locking tangs 23 and 24 projecting in the directions of the handle portion 11 and the rod portion 12, respectively. The saddle 22 also carries laterally projecting upwardly arcuately curved reel mounts 25 and 26 to which the reel 21 is mounted in conventional manner.

Adjacent to the distal end portion of the tubular metal sleeve 14, the sleeve is provided with a transverse slot 30, said slot extending symmetrically across the top of said sleeve a substantial distance. An edge of material surrounding the slot 30 is disposed radially upwardly and outwardly to form a socket portion or hood 31 integral with the sleeve which tapers radially inwardly in the direction of said ferrule end of the rod 12. The hood 31 is adapted to receive the tang 24 of the saddle thereby retaining one end of the reel stand or base 20 as hereinafter more fully described.

Figure 3:
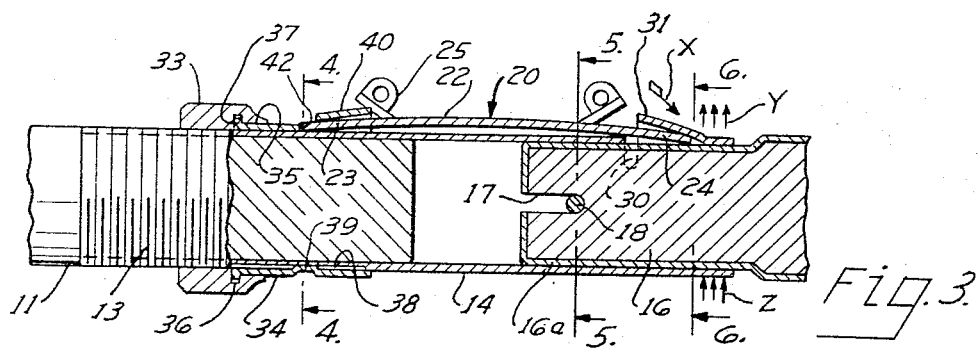
FIGURE 3 is a longitudinal section on an enlarged scale taken along the line 3—3 of FIGURE 2.
Figure 4:
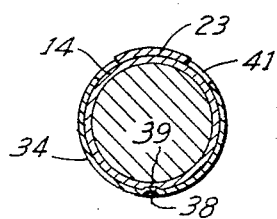
FIGURE 4 is a transverse section taken along the line 4—4 of FIGURE 3.
Figure 5:
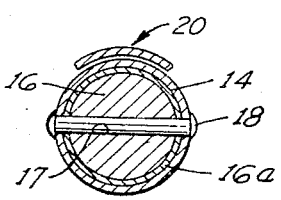
FIGURE 5 is a transverse section taken along the line 5—5 of FIGURE 3.
Figure 6:
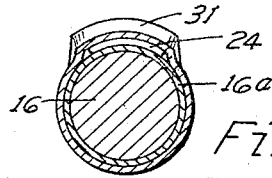
FIGURE 6 is a transverse section taken along the line 6—6 of FIGURE 3.

A large, preferably knurled or fluted internally threaded locking nut 33 is threaded on the threaded end portion 13 of the sleeve 14 and a relatively short, outer bushing or sleeve 34 carried by said nut is loosely telescoped over the sleeve 14. As best shown in FIGURE 3, the locking nut 33 has an enlarged bore portion 35 for receiving the outer sleeve 34 and an internal, circumferential groove 36 for receiving the annular flange 37 of the sleeve 34. The sleeve 34 projects in the direction of the rod 12, hereinafter referred to as the forward direction, and the interlocked flange 37 and groove 36 retains said outer sleeve and the lock nut 33 against longitudinal displacement while at the same time permitting free relative rotation therebetween. The bottom of the threaded portion 13 is disclosed preferably in FIGURES 3 and 4 as provided with an elongated groove 38 which extends parallel with the axis of the sleeve 14, and the outer sleeve 34 is provided with a radially inwardly formed dimple or detent 39 which slidably interfits said groove 38. The detent and groove arrangement prevents relative rotation between the outer sleeve 34 and the relatively inner sleeve 14 while allowing longitudinal movement of said outer sleeve when the locking nut 33 is turned.

The forward edge portion of the outer sleeve 34 is formed with a radially upwardly and outwardly extending socket portion or hood 40 similar to hood 31 which tapers rearwardly or toward the handle portion 11, in a manner similar but in the opposite direction of the hood 31. A transverse slot 41 is provided in the outer sleeve 34 at the rearward portion of the hood 40, and said hood 40 is adapted to receive the tang 23 of the saddle 22, the distal end portion of said tang adapted to be projected into the slot 41 and to abut the portion of the sleeve 34 at the rear edge of the slot 41. The tang 23 is thereby disposed in alignment with the rearward edge of the slot 41, hereinafter, referred to as the driving edge 42.

It will be readily understood that, in use, by rotating the locking nut 33 in one direction, such as counterclockwise (assuming that the end portion 13 has a normal, right-hand thread) the rearmost hood 40 can be moved rearwardly toward the handle portion 11 for either removal of a reel stand or base 20 or the mounting of such reel stand or base on the top of the tubular sleeve 14. Prior to mounting said reel stand, the shank 16 of the rod 12 would be inserted into said sleeve 14. The tang 24 of the saddle 22 is then inserted into the most forwardly disposed hood 31 after which the locking nut 33 is rotated to move the hood 40 forwardly over the tang 23. This brings the driving edge 42 of the slot 41 against the distal end of the tang 23.

Continued, forceful rotation of the locking nut 23 rigidly secures the reel base or stand 20 to the fishing rod assembly and simultaneously firmly locks the shank 16 of the rod 12 within the sleeve 14 against withdrawal therefrom as described hereinafter.

The forward movement of the driving edge 42 drives the tang 24 more deeply into the tapered hood 31. There is no binding or clamping of the tang 23 because the end portion of said tang 23 is disposed within the slot 41 and is not pressed radially inwardly by the hood 40. However, the hood 31, because of its inward taper, cams the distal end of the tang 24 radially inwardly against the ferrule enclosed rod. The ferrule 16a (FIGURE 3) for the shank 16 is preferably formed of steel or other relatively non-penetrable material whereby the end of the tang 24 presses forcefully against the outer surface of said shank without deforming it. At the same time, a substantial reactive force is directed radially outwardly against the upper portion of the sleeve 14 as the distal end of the tang 24 wedges more deeply between the hood 31 and the shank 16. This results in a radially inwardly directed pressure against said ferrule 16a at the bottom of the sleeve 14 thereby causing said sleeve to bind or seat more tightly against the ferrule enclosed rod. The rod is thus firmly held in a viselike grip between the tang 24 of the saddle on the top and the sleeve 14 on the bottom.

The directions of the forces described above are shown by arrows in FIGURE 3 of the drawings. The single, large arrow X shows the manner in which the tang 24 is driven rearwardly with a substantial downward component of force due to the camming affect of the hood 31. The upper group of small arrows Y represents the upward, reactive thrust of the top of the sleeve 14. And the lower group of small arrows Z illustrates the radially inward pressure of the bottom of the sleeve 14.

Figure 7:
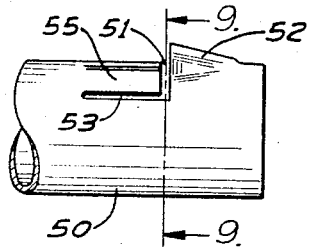
FIGURE 7 is a fragmentary side elevation of a modified front clamping portion of the rod clamp and reel seat of this invention according to a second embodiment thereof.
Figure 8:
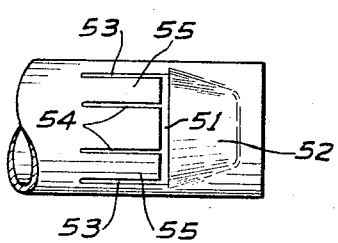
FIGURE 8 is a top plan view of the clamping portion of FIGURE 7.
Figure 9:
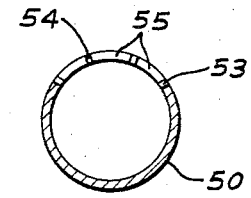
FIGURE 9 is a transverse section taken along the line 9—9 of FIGURE 7.
Figure 10:
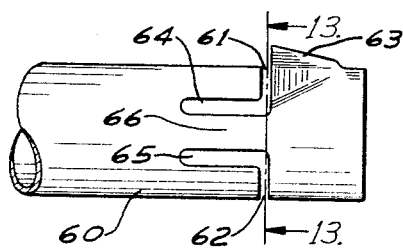
FIGURE 10 is a fragmentary side elevation of a further modified front clamping portion of the rod clamp and reel seat of this invention according to a third embodiment thereof.
Figure 11:
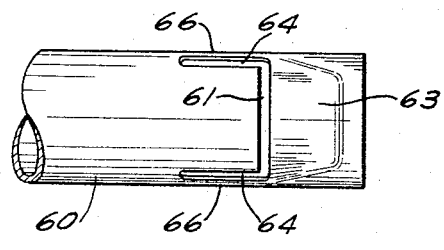
FIGURE 11 is a top plan view of the clamping portion of FIGURE 10.
Figure 12:
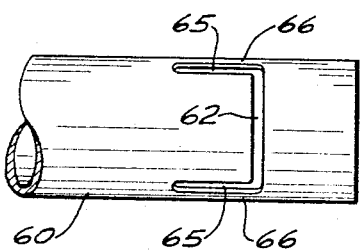
FIGURE 12 is a bottom plan view of the clamping portion of FIGURE 10.
Figure 13:
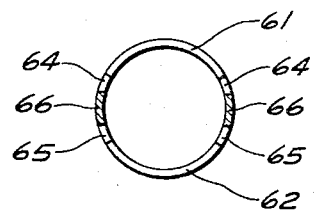
FIGURE 13 is a transverse section taken along the line 13—13 of FIGURE 10.
Figure 14:
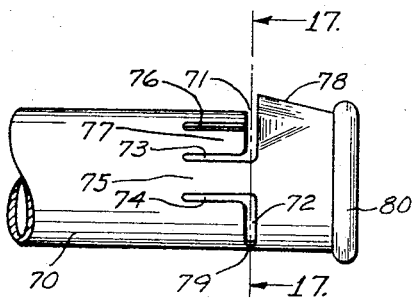
FIGURE 14 is a fragmentary side elevation of a still further modified front clamping portion of the rod clamp and reel seat of this invention according to a fourth embodiment thereof.
Figure 15:
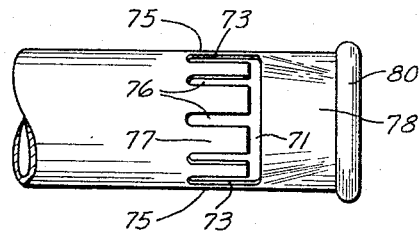
FIGURE 15 is a top plan view of the clamping portion of FIGURE 14.

The tubular sleeve 14, rearwardly of the slot 30, does not substantially interfere with the radially inward movement of the tang 24 due to the inherent resilience of the metallic tubing wall. However, the area of the sleeve 14 just rearwardly of the slot 30 can be made even more resilient by the addition of longitudinal slots therein, as illustrated in the second embodiment of my invention disclosed in FIGURES 7 to 9, inclusive. In the said second embodiment the tubular sleeve 50 is provided with a transverse slot 51 and a forward hood 52 similar to the sleeve 14, slot 30, and hood 31. Adjacent to its ends, however, in this form the slot 51 is intersected by longitudinal slots 53 and intermediate said ends by longitudinal slots 54. Between said slots, there are thus provided elongated fingers 55 of metal which form spring members when pressed inwardly by the tang 24.

The third embodiment of my invention, as disclosed in FIGURES 10–13 herein, involves the use of a tubular sleeve 60 provided with an upper transverse slot 61 similar to the slot 31 in the form of FIGURES 1 and 2, and a lower transverse slot 62 spaced therefrom. As in the first two forms of my invention, a hood is provided at 63 for receiving the tang 24, and the ends of the transverse slots 61 and 62 are intersected by longitudinal slots 64 and 65, respectively. Between the opposite ends of the slots 61 and 62 and between the longitudinal slots 64 and 65 there are provided parallel, diametrically oppositely disposed strips of metal 66 which act as springs enabling the front hood to 63 to move upwardly a sufficient degree to more securely lock the shank 16 of the rod 12 within the sleeve 60. Thus the front portion of said sleeve can be forced out of alignment with the remainder of the sleeve, holding the shank 16 in a locking grip.

Figure 16:
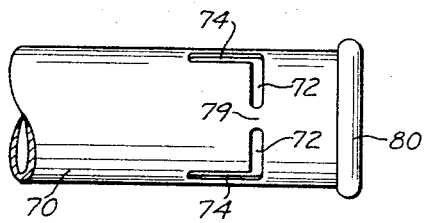
FIGURE 16 is a bottom plan view of the clamping portion of FIGURE 14.
Figure 17:
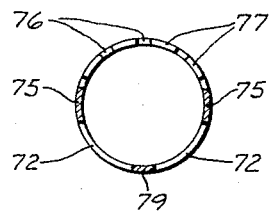
FIGURE 17 is a transverse section taken along the line 17—17 of FIGURE 14.

In the fourth embodiment of my invention disclosed in FIGURES 14–17, a still further modification of the tubular sleeve 70 is disclosed, said sleeve being provided with an upper transverse slot 71, a lower transverse slot 72, longitudinal slots 73 and 74 at the end of said slots 71 and 72, respectively, springlike strips 75, and intermediate upper slots 76 defining fingers 77 therebetween. Forwardly of the transverse slot 71 there is provided a hood 78. The fourth embodiment differs from the third embodiment above described primarily in that the lower transverse slot 72 is interrupted in the middle by an integral tab 79 (FIGURE 16). The said tab 79 reinforces the sleeve 70 against an edgewise blow to its distal end such as might be received during shipping, assembly, and the like. In the disclosure an annular, rounded boss 80 is further shown disposed at the distal end of the sleeve 70 which further strengthens and protects such distal end and at the same time enhancing its appearance.

Figure 18:
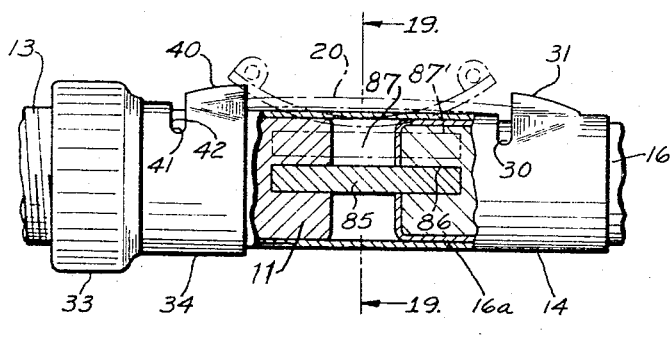
FIGURE 18 is a partial longitudinal section, similar to FIGURE 3, showing two forms of retainer means for preventing rotation between a fishing rod and handle, according to further embodiments of the invention, one form shown in section lines and one in dotted lines.
Figure 19:
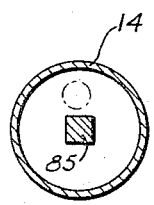
FIGURE 19 is a transverse section taken along the line 19—19 of FIGURE 18.

The final embodiments of FIGURES 18 and 19 are directed to alternative means for aligning the handle portion 11 and the rod portion 12. This means comprises either a noncircular pin 85 or a circular pin 87 fixedly carried either by the handle portion 11 or the shank 16 of the rod 12 and slidably fitting into a complementary socket 86 or 87' formed in the other element. Preferably, the pin 85 is carried by the handle portion 11 as shown whereby it is recessed within the sleeve 14 and the socket 86 or 87' is formed in the distal end of the shank 16. It will be noted that the pin 85 or 87 may be eccentrically located in the handle, as shown in the dotted line portion of FIGURE 18, and secured in an eccentrically located opening such as opening 87′ in the shank portion 16 to lock the assembled parts in a rotationally fixed position with respect to each other.

It will be readily understood that many changes in the details as herein described and illustrated may be made without, however, departing from the spirit thereof or the scope of the appended claims.

What I claim is:

1. A rod and reel assembly comprising a tubular reel seat member having an externally threaded portion, a nut rotatable on said threaded portion, a sleeve slidable upon said tubular member, said nut being rotatably connected to one end portion of said sleeve, said sleeve having a longitudinally disposed, radially outwardly offset socket portion adapted to fit over one tang of a reel stand disposed against said tubular member, said socket having its tang receiving end directed away from said nut, means providing a transverse slot at the opposite end of said socket, said slot having an edge portion adapted to abut the end of said one tang and exert a driving force thereagainst when said nut is tightened, a rod shank disposed within said tubular member, said tubular member having a longitudinally disposed, radially outwardly offset socket portion adapted to fit over the opposite tang of said reel stand, said second mentioned socket having its tang receiving end directed toward said nut and said second mentioned socket tapering radially inwardly in a longitudinal direction away from said nut and forming a tapered hood, said tubular member being open beneath said tapered hood whereby said opposite tang projects beneath said tapered hood and presses forcefully against the outer surface of said rod shank, the tightening of said nut wedging said opposite tang tightly against said rod shank, and causing the circumferential portion of said tubular member opposite said tapered hood to be clamped tightly against said rod shank thereby locking said rod shank in position.

2. A rod and reel assembly comprising a tubular reel seat member having an externally threaded portion, an actuating nut rotatable on the screw threaded portion of the tubular member having a reel seat engageable sleeve slidable on said member, said nut being rotatably connected to the end portion of said sleeve, said sleeve having a longitudinally disposed socket portion radially outwardly formed from a portion of the circumference of said sleeve, said socket having a forward open end directed away from said nut and having a transverse slot disposed at the rearward edge of said socket portion of the sleeve, said tubular member having at an opposite end a second longitudinally disposed socket radially outwardly formed from a portion of the circumference of said tubular member thereby being open beneath said socket and having a forward open end facing the open end of said first mentioned socket, said second mentioned socket being tapered radially inwardly from the open end thereof in a longitudinal direction, a rod disposed within the opposite end of the tubular member beneath the second socket, said sockets adapted to receive the tangs of a reel stand whereby when said nut is tightened, the rearward edge of said first mentioned transverse slot abuts an end of one tang and drives the other tang into said second socket through the opening thereunder and into forceful engagement with the outer surface of said rod.

3. A rod and reel assembly comprising a tubular reel seat member having an externally threaded portion, an actuating nut rotatable on the screw threaded portion of the tubular member having a reel seat engageable sleeve slidable on said member, said nut being rotatably connected to the end portion of said sleeve, said sleeve having a longitudinally disposed socket portion radially outwardly formed from a portion of the circumference of said sleeve and having a forward open end directed away from said nut, said socket being tapered radially inwardly from the open end thereof in a longitudinal direction and having a first transverse slot in the rearward edge portion of said socket portion of the sleeve, said tubular member having at an opposite end a second longitudinally disposed socket radially outwardly formed from a portion of the circumference of said tubular member thereby being open beneath said socket and having a forward open end facing the open end of said first mentioned socket, said second mentioned socket being tapered radially inwardly from the open end thereof in a longitudinal direction, a second transverse slot being provided in said tubular member adjacent the forward open edge of said second socket, a rod disposed within the opposite end of the tubular member beneath the second socket, a reel stand having oppositely directed tangs, one of said tangs being disposed within the socket portion of the sleeve and the opposite tang being seated within the said second mentioned socket whereby rotation of said nut forces an edge of the sleeve bordering said first slot against said one tang, the opposite tang being driven into said second mentioned socket through the opening thereunder and into forceful engagement with the outer surface of said rod.

4. A rod and reel assembly as claimed in claim 3 whereby said edge exerts forward thrust against the reel stand causing the opposite tang within the said second socket to be wedged between said second socket and said rod whereby the portion of said tubular member opposite said second mentioned socket is clamped tightly against said rod to lock the rod within the tubular member.

5. A rod and reel assembly as set forth in claim 2, including means defining a second transverse slot in said tubular member adjacent the forward open edge of said second mentioned socket.

6. A rod and reel assembly as claimed in claim 5 having said tubular member provided with a pair of longitudinally extending slots communicating with said opposite ends of the second transverse slot in the tubular member adjacent the forward open end of the second mentioned socket whereby the portion of said tubular member adjacent to the open end of said second socket is relieved to flex inwardly.

7. A rod and reel assembly as claimed in claim 6 having longitudinal slots communicating with other portions of said second transverse slot.

8. A rod and reel assembly as claimed in claim 5 in which a third transverse slot is provided in said tubular member diametrically opposite and circumferentially aligned with the second transverse slot disposed adjacent the forward open edge of said second mentioned socket, said second and third transverse slots being provided with longitudinally extending slots projecting away from said second mentioned socket and disposed in communication with the ends of each of said second and third transverse slots whereby lateral, parallel, diametrically opposed, longitudinally directed metallic strips are interposed between said second and third transverse slots.

9. A rod and reel assembly as claimed in claim 5 in which a third transverse slot is provided in said tubular member diametrically opposite and circumferentially aligned with the second transverse slot disposed adjacent the forward open edge of said second mentioned socket, said second and third transverse slots being provided with longitudinally extending slots projecting away from said second mentioned socket and disposed in communication with the ends of each of said second and third transverse slots whereby lateral, parallel, diametrically opposed, longitudinally directed, metallic strips are interposed between said second and third transverse slots, said third transverse slot being interrupted by a tab integral with the tubular member and located diametrically opposite the said second socket.

10. Reel seat means comprising a tubular member having a rod shank slidably telescoped therein, a sleeve slidably telescoped over said tubular member, said tubular member and said sleeve having longitudinally disposed sockets radially outwardly formed from wall portions of said tubular member and said sleeve, said sockets having open ends facing each other and adapted to receive the tangs of a reel stand, said sleeve socket having a transverse slot at the edge thereof rearwardly of its open end whereby the rearmost edge of said slot is disposed rearwardly of said sleeve socket, said sleeve socket being tapered radially inwardly from the open end thereof toward said transverse slot whereby the tang received thereby projects through and beyond said sleeve socket to said rearmost edge, and is afforded clearance thereabove within said sleeve socket, and means for advancing said sleeve toward the socket of said tubular member whereby said rearmost edge abuts one tang of the reel stand and wedges the other tang in the socket of said tubular member into forceful engagement with the outer surface of the rod.

11. Reel seat means comprising a tubular member having a rod shank slidably telescoped therein, said tubular member comprising a first end portion and a second end portion, a sleeve slidably telescoped over said first end portion, said second end portion and said sleeve having longitudinally disposed sockets radially outwardly formed from wall portions of said tubular member and said sleeve, said sockets having open ends facing each other and adapted to receive the tangs of a reel stand, means for advancing said sleeve toward the socket of said second end portion to engage one of said tangs and wedge the opposite tang in the socket of said second end portion into forceful engagement with the outer surface of the rod, said first end portion and said second end portion being connected to each other by longitudinally directed, oppositely disposed strips circumferentially spaced on either side of the socket of said second end portion whereby said second end portion can shift transversely into tight engagement with the rod.

References Cited

UNITED STATES PATENTS

| | | | |
|---|---|---|---|
| 1,624,052 | 4/1927 | Heddon et al. | 43—22 |
| 1,870,078 | 8/1932 | Welch | 43—22 |
| 2,166,407 | 7/1939 | Howarth | 43—22 |
| 2,409,940 | 10/1946 | Kay | 43—22 |
| 2,479,952 | 8/1949 | Matson | 43—22 |
| 2,592,878 | 4/1952 | Esposito | 43—22 |
| 2,885,816 | 5/1959 | Cunningham et al. | 43—22 |

FOREIGN PATENTS 767,072   1/1957   Great Britain.

SAMUEL KOREN, *Primary Examiner.*

D. J. LEACH, *Assistant Examiner.*